Oct. 28, 1969 B. A. WHITEMAN 3,474,983
DEVICE FOR AND METHOD OF MAKING A COIL CONSTRUCTION
Filed Sept. 29, 1967 6 Sheets-Sheet 1

INVENTOR
BENTON A. WHITEMAN
BY Glenn, Palmer
& Lyne
HIS ATTORNEYS

Oct. 28, 1969  B. A. WHITEMAN  3,474,983
DEVICE FOR AND METHOD OF MAKING A COIL CONSTRUCTION
Filed Sept. 29, 1967  6 Sheets-Sheet 2
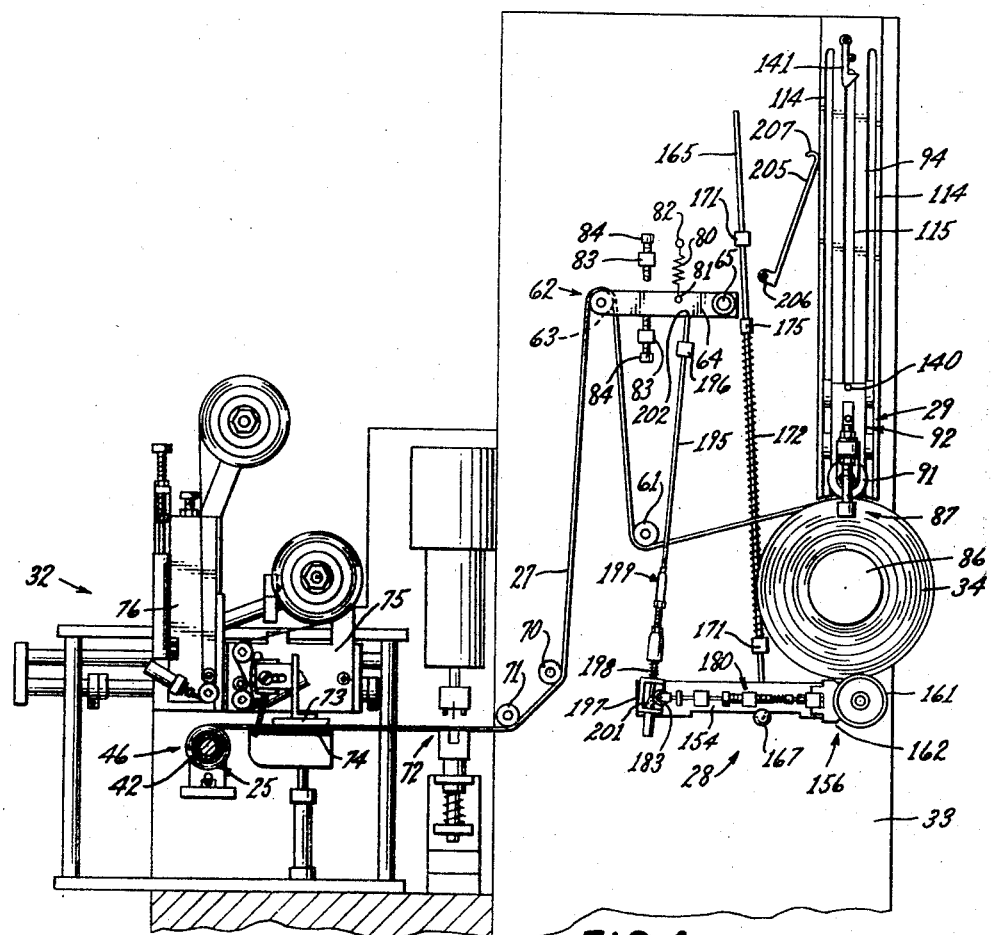
FIG. 4
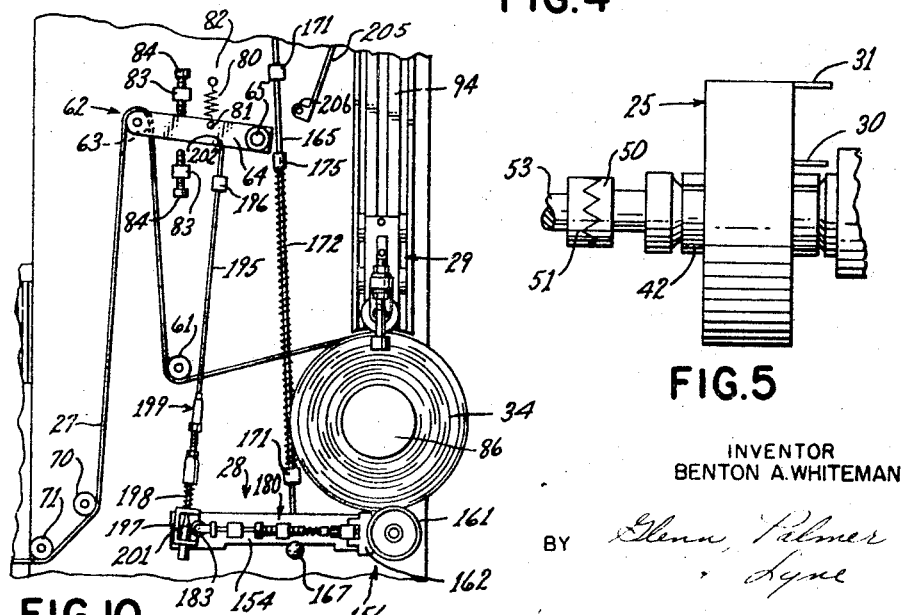
FIG. 10
FIG. 5
INVENTOR
BENTON A. WHITEMAN
BY Glenn, Palmer
  & Lyne
HIS ATTORNEYS

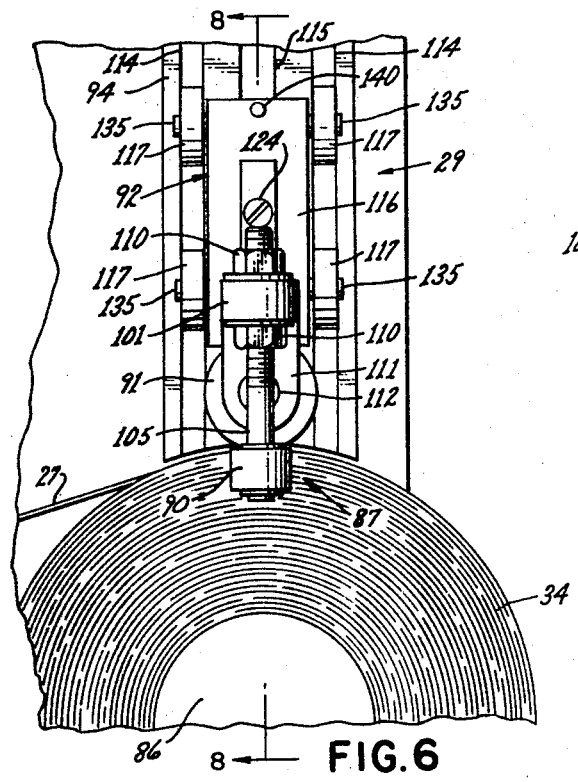
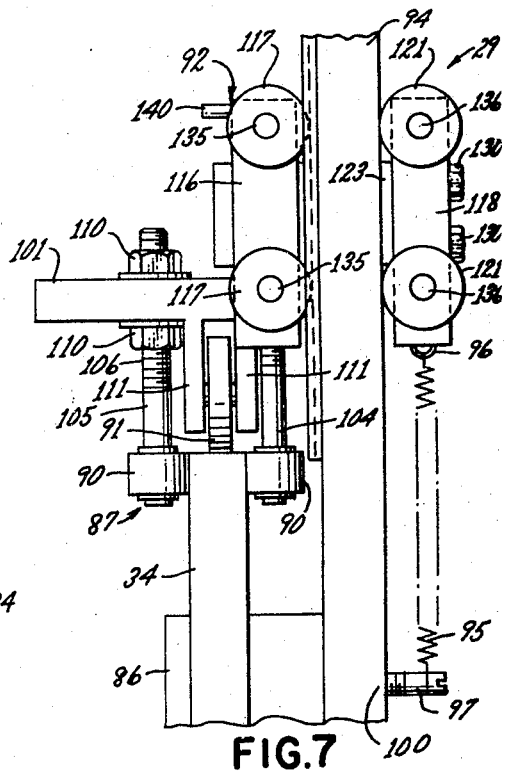
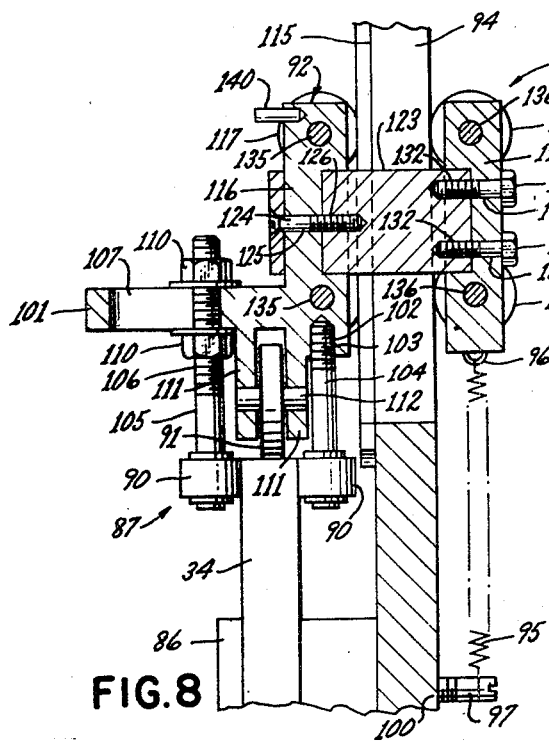
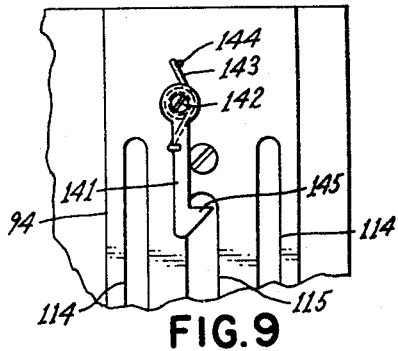

Oct. 28, 1969 B. A. WHITEMAN 3,474,983
DEVICE FOR AND METHOD OF MAKING A COIL CONSTRUCTION
Filed Sept. 29, 1967 6 Sheets-Sheet 4
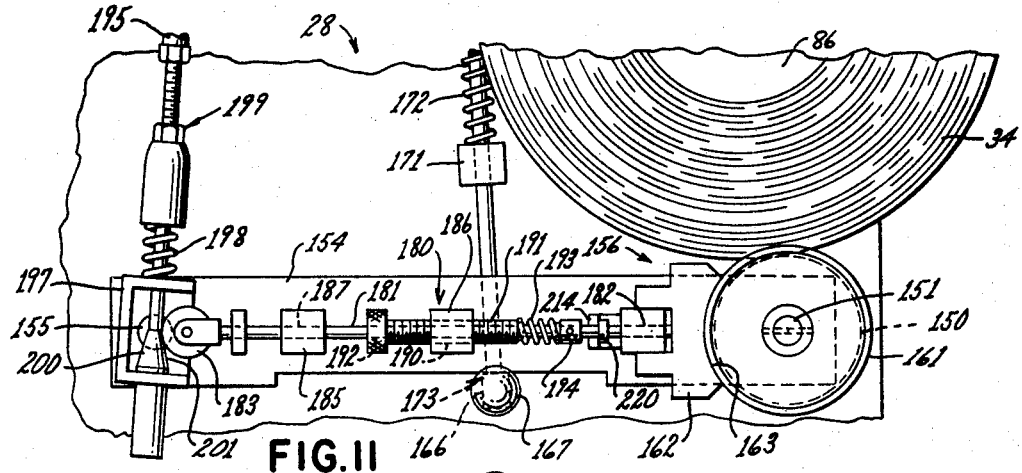
FIG.11
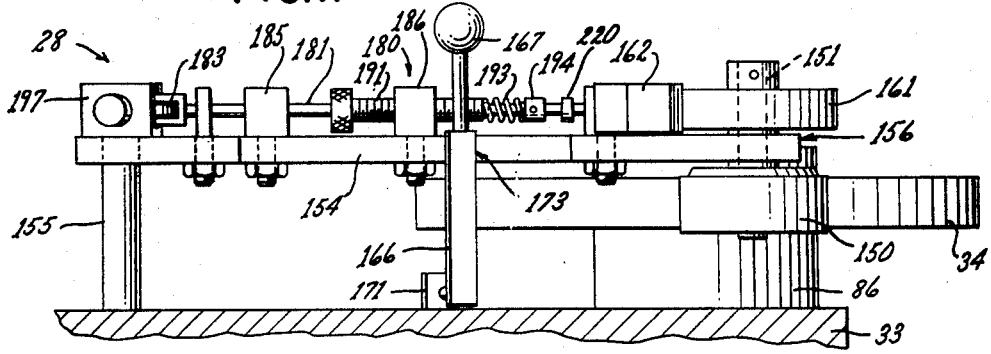
FIG.12
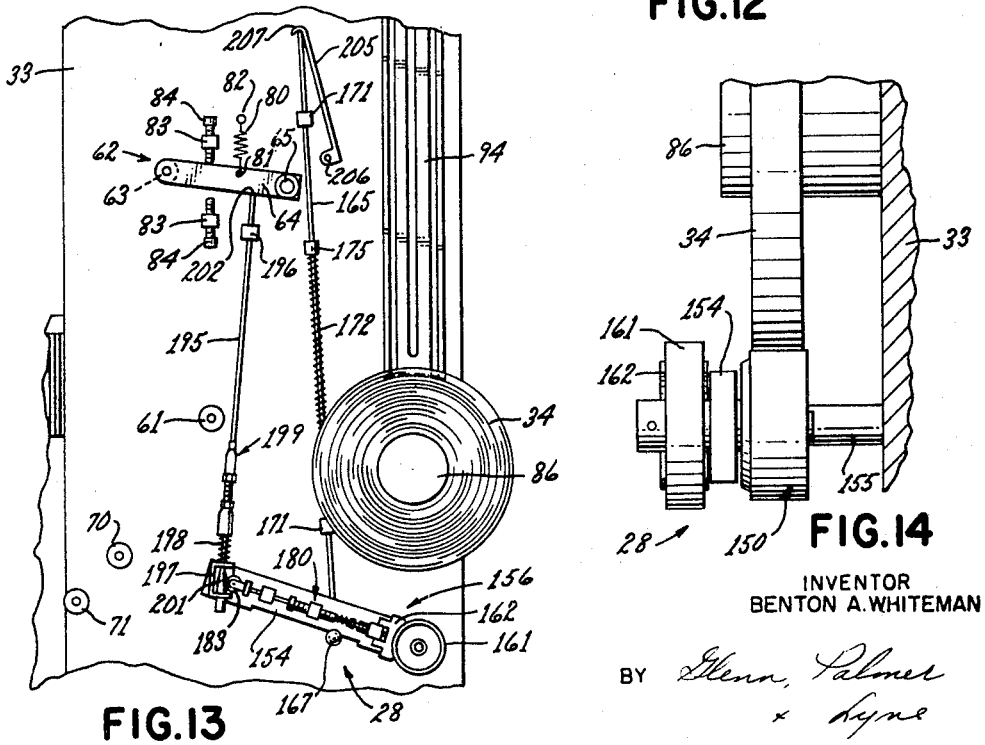
FIG.13
FIG.14
INVENTOR
BENTON A. WHITEMAN
BY Glenn, Palmer
& Lyne
HIS ATTORNEYS Oct. 28, 1969   B. A. WHITEMAN   3,474,983
DEVICE FOR AND METHOD OF MAKING A COIL CONSTRUCTION
Filed Sept. 29, 1967   6 Sheets-Sheet 5

INVENTOR
BENTON A. WHITEMAN

BY Glenn, Palmer
& Lyne

HIS ATTORNEYS

Oct. 28, 1969  B. A. WHITEMAN  3,474,983
DEVICE FOR AND METHOD OF MAKING A COIL CONSTRUCTION
Filed Sept. 29, 1967  6 Sheets-Sheet 6

INVENTOR
BENTON A. WHITEMAN

BY Glenn, Palmer & Lyne

HIS ATTORNEYS

United States Patent Office 3,474,983
Patented Oct. 28, 1969

3,474,983
DEVICE FOR AND METHOD OF MAKING A COIL CONSTRUCTION
Benton A. Whiteman, Richmond, Va., assignor to Reynolds Metals Company, Richmond, Va., a corporation of Delaware
Filed Sept. 29, 1967, Ser. No. 671,841
Int. Cl. B65h 25/22
U.S. Cl. 242—75.43          17 Claims

ABSTRACT OF THE DISCLOSURE

This disclosure relates to a control device and method which provides controlled unwinding of elongated material means from a substantially freely rotatable supply roll thereof during the unwinding of a section of such material means to define a coil construction. The disclosed device and method enable such unwinding (and hence winding of the coil construction) to be achieved under substantially uniform tension. In addition such device and method assure the supply roll is kept from overrunning once the unwinding action is stopped.

CROSS-REFERENCE TO RELATED APPLICATION

This application is related to copending patent application, Ser. No. 497,069, filed Oct. 18, 1965, and now Patent No. 3,412,450.

BACKGROUND OF THE INVENTION

During the unwinding of an elongated strip of electrically conductive material from a substantially freely rotatable supply roll thereof provided in association with a strip conductor coil winding apparatus, for example, it has been found that more accurately defined coil constructions are provided if such unwinding of the strip material (and hence winding of each coil construction) is achieved under substantially uniform tension. It has also been found that if the unwinding action is stopped for any reason such as to fasten electrical leads in position, etc., the tendency of the supply roll is to overrun which may cause considerable difficulty in restarting the apparatus in a smooth manner.

SUMMARY

This invention provides a control device and method for keeping material means used to form a coil construction under substantially uniform tension by controlling the unwinding of such material means from a substantially freely rotatable supply roll of such material means. This invention also provides a simple device and method for overcoming the inertia of the unwinding system to prevent such supply roll from overrunning in the event the unwinding operation is slowed down or stopped.

Other details, uses, and advantages of this invention will become apparent as the following description of the exemplary embodiment thereof presented in the accompanying drawings proceeds.

BRIEF DESCRIPTION OF THE DRAWINGS

The accompanying drawings illustrate a present preferred embodiment of this invention, in which

FIGURE 4 is a view on the line 4—4 of FIGURE 2 particularly illustrating the arrangement of the brake device of this invention on the apparatus of FIGURE 2;

FIGURE 5 is a fragmentary view showing the manner of coupling a freely rotatable core carrying mandrel with drive means therefor;

FIGURE 6 is an enlarged fragmentary view in elevation particularly illustrating carriage means comprising a control device provided on the coil winding apparatus of FIGURE 2 to control the unwinding of the strip material used to make the coil construction of FIGURE 1 from a supply roll thereof;

FIGURE 7 is an enlarged fragmentary end view of the carriage means and associated structure as illustrated in FIGURE 6;

FIGURE 8 is a sectional view on the line 8—8 of FIGURE 6;

FIGURE 9 is an enlarged fragmentary view particularly illustrating latch means used to latch the carriage means in position above the supply roll;

FIGURE 10 is a fragmentary view in elevation of an exemplary embodiment of the device of this invention which is used to provide coils wound under uniform tension;

FIGURE 11 is an enlarged fragmentary view in elevation particularly illustrating the arrangement of brake means comprising the device of this invention;

FIGURE 12 is a fragmentary view looking generally upwardly toward the control device of this invention and showing only certain ones of the operating components;

FIGURE 13 is a fragmentary view in elevation showing disabling handle means used to override urging means which normally urges an arm assembly carrying roller means and brake means of the exemplary device of this invention away from the supply roll of strip material;

FIGURE 14 is a fragmentary view particularly illustrating the roller means held against the supply roll and a brake drum which is fixed on a common freely rotatable tubular shaft with such roller means;

DESCRIPTION OF THE ILLUSTRATED EXEMPLARY EMBODIMENT

Figure 1:
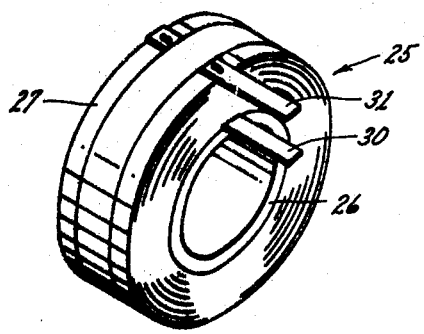
FIGURE 1 is a perspective view of an exemplary strip conductor coil made on a coil winding apparatus using the improved device of this invention.

An exemplary strip conductor coil construction or coil made while using the device and method of this invention is shown in FIGURE 1 and indicated generally by the reference numeral 25. The coil 25 comprises a tubular and substantially right circular cylindrical core element 26 which has a ribbon or strip 27 of electrically conductive material wound thereon in a manner as will be hereinafter described. The strip 27 has inner end means comprising an inner electrical lead 30 fixed thereto and outer end means comprising an outer electrical lead 31 suitably fixed thereto. The completed coil 25 is adapted to be installed in an associated electrical system with its leads 30 and 31 suitably electrically connected in a known manner.

In the exemplary coil 25 presented in FIGURE 1 the under side of the elongated strip of conductive material 27 preferably has a strip or coating of insulating material prelaminated thereagainst before strip 27 is wound on the core element 26 to provide electrical insulation means between adjacent coils of the strip of conductive material 27. However, if desired, strip 27 can be wound on core element 26 in unison with a separate strip of insulating material so that the strip of insulating material is interleaved between adjacent coils of the strip of conductive material 27 to electrically insulate adjacent coils of strip 27 from each other.

Figure 3:
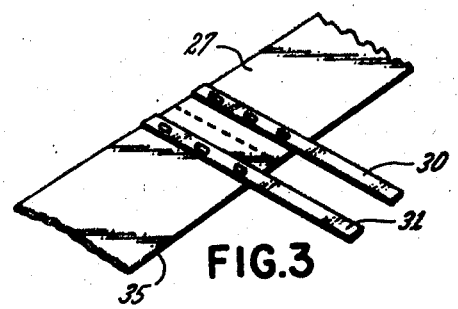
FIGURE 3 is a fragmentary perspective view illustrating electrical leads attached to an elongated strip of electrically conductive material used in forming the coil construction of FIGURE 1.
Figure 2:
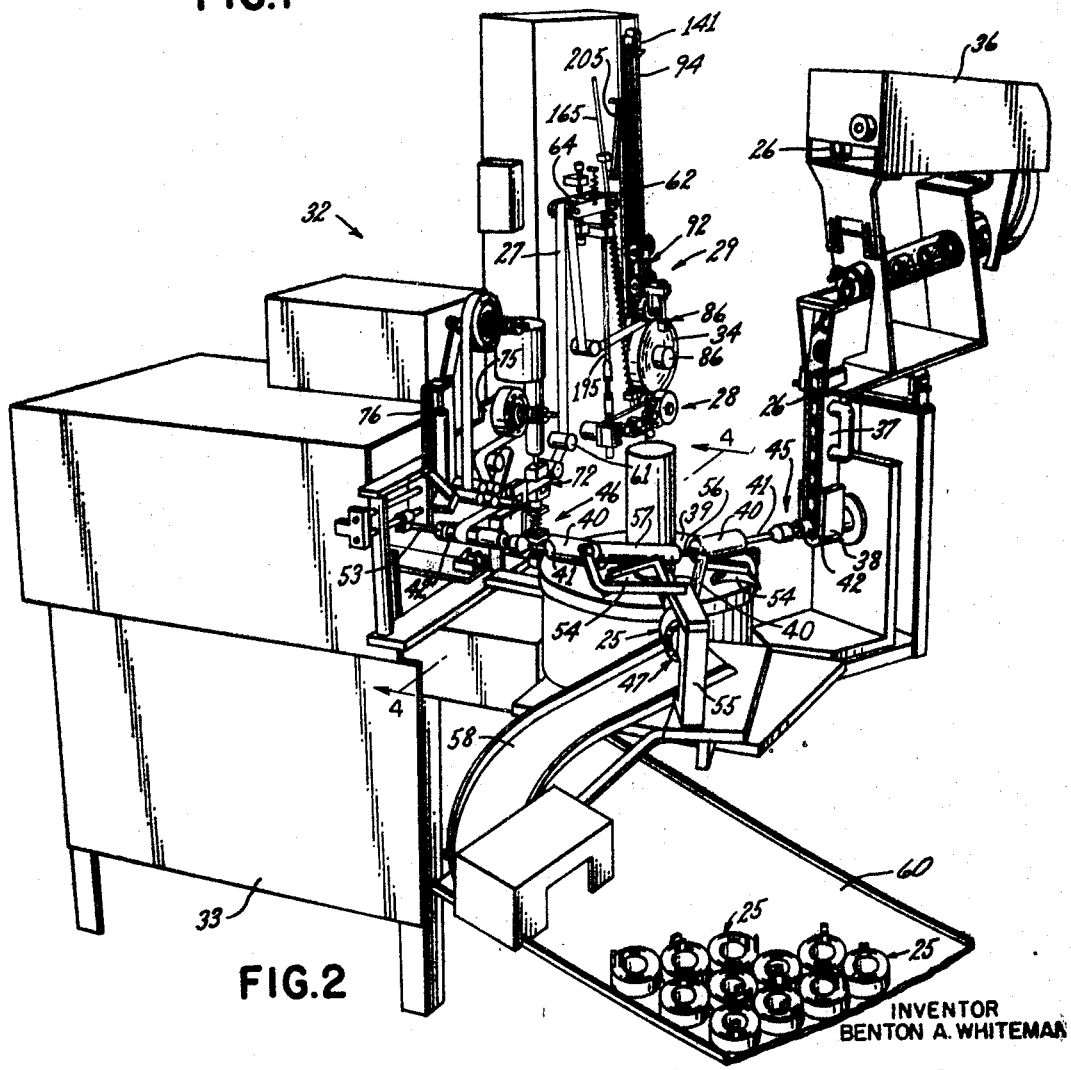
FIGURE 2 is a perspective view illustrating one exemplary embodiment of such coil winding apparatus which is used to make the coil construction of FIGURE 1.

The exemplary coil winding apparatus used in forming the strip conductor coil construction 25 of FIGURE 1 in a substantially continuous manner is generally indicated by the reference numeral 32 in FIGURE 2. The apparatus 32 includes a frame structure 33 rotatably carrying a supply roll 34 of conductive strip material 27 for substantially free wheeling rotation. As previously stated, the strip material 27 preferably has a strip or coating 35 of insulating material laminated to its lower surface, as illustrated in FIGURE 3, to provide electrical insulation between adjoining coils.

During the forming or winding of coil construction 25 it has been found that the coil form can be more accurately controlled when strip 27 is kept under substantially uniform tension. Also, during the winding of coil construction 25 it is necessary to stop the winding operation for numerous reasons, as for example, to attach leads 30 and 31 in position. However, as previously indicated the supply roll 34 is supported for substantially free wheeling rotation about its supporting shaft.

This invention provides means such as improved control device designated generally by the numeral 28 which assures that strip 27 is unwound from supply roll 34 and wound on an associated core element 26 under substantially uniform tension to define coil construction 25. The device 28 also assures that the supply roll 34 will not overrun, due to the inertia of the unwinding system, in the event the unwinding operation is slowed down or stopped by providing means for abruptly and forcefully stopping the supply roll in response to reduced tension in strip 27 as it moves from supply roll 34 to the coil winding station. The device 28 of this invention will be described in detail later in this specification after presenting a description of the operation of apparatus 32.

In many applications the housing means, or the like, provided immediately adjacent the coil 25 may have a closely controlled configuration requiring that coil 25 also have an outer peripheral configuration which is controlled in a corresponding manner. The apparatus 32 includes a control device designated by the numeral 29 which has means for accurately controlling the strip 27 as it is unwound from the supply roll 34 to thereby effectively control the configuration of coil 25 as each associated section of strip 27 is wound on an associated core 26. The manner in which the device 29 operates to provide such controlled unwinding will be explained in detail subsequently.

The tubular core elements may be made of cardboard of the like and are contained in a suitable hopper means or hopper 36. The hopper 36 has a downwardly extending chute 37 extending from its lower end. Each core element is adapted to be serially fed into a retainer 38 provided at the terminal lower end of chute 37 and supported to enable it to be easily picked up by an associated mandrel in a manner to be subsequently described.

As illustrated in FIGURE 2, the frame structure 33 carries a rotary table 39 which is adapted to be indexed in a rotary manner about a fixed vertical axis. The table 39 carries three actuating means or actuators shown as three fluid cylinders each designated by the numeral 40.

Each cylinder 40 has a telescoping rod 41 which carries support means enabling coil 25 to be formed thereon and such support means comprises a radially expandable and freely rotatable mandrel 42 carried at the terminal end of telescoping rod 41. Each cylinder 40 is adapted to extend and yieldingly hold its mandrel 42 into operative engagement with drive means therefor in a known manner.

The table 39 is adapted to index the mandrels 42 through three stations 45, 46, and 47. When a mandrel 42 is indexed to station 45, the associated cylinder 40 extends associated rod 41 radially outwardly telescoping mandrel 42 within a core element 26 supported within retainer 38 at the lower end of hopper 36.

When the mandrel 42 at station 45 has a core 26 thereon, the associated piston rod 41 is retracted by cylinder 40 so that the core 26 is carried by mandrel 42 out of the retainer 38 whereby such retracted mandrel can be indexed from station 45 to winding station 46. Hopper 36 contains a plurality of cores 26 which are adapted to be serially dropped into retainer 38 through chute 37 as previously mentioned. As each core 26 is removed by an associated mandrel from retainer 38 another core 26 drops in its place.

With the core carrying mandrel 42 now at station 46, the piston rod 41 thereof is extended to interconnect mandrel 42 by suitable driven clutch means 50 provided in its terminal outer end to suitable cooperating driving clutch means 51 provided on a rotatable drive shaft 53 comprising winding apparatus 32, see FIGURES 1 and 5. As the drive shaft 53 is rotated, the same rotates mandrel 42 at station 46 to cause elongated strip 27 to be wound on the core 26 carried by the rotating mandrel 42 to define coil construction 25. The elongated strip 27 is unwound from supply roll 34 and is held in a substantially vertical plane by the control device 29 to enable forming of coil construction 25 in the desired manner.

After a completed strip conductor coil 25 has been formed on mandrel 42 at station 46, the associated piston rod 41 is retracted to thereby disconnect the driven mandrel 42 from drive shaft 53 and specifically to thereby move driven clutch means 50 away from driving clutch 51, whereby the retracted mandrel 42 is then indexed from station 46 to station 47. With the completed strip conductor coil 25 on mandrel 42 at station 47, the associated piston rod 41 is extended whereby the strip conductor coil 25 is held in a position at the station 47 so that a pair of stripping members each designated by the numeral 54, see FIGURE 2, can strip the finished strip conductor coil from mandrel 42.

The stripping members 54 are pivotally mounted to a support 55 by suitable pivot pins respectively carrying pinion gears disposed in meshing relation with each other. One of the stripping members 54 is interconnected to a piston rod 56 adapted to be extended and retracted by a fluid cylinder 57 carried by support 55. Thus, with a completed strip conductor coil 25 being held at station 47 by an extended mandrel 42, cylinder 57 is actuated to telescope its rod 56 outwardly and through the action of the above mentioned pinion gears stripping members 54 are brought into clamping engagement in a known manner on opposite sides of coil 25.

With the strip conductor coil 25 now firmly clamped between the stripping members 54 retraction of the piston rod 41 of the mandrel 42 at station 47 pulls such mandrel out of the core 26 of the completed strip conductor coil 25 so that the particular mandrel 42 can be subsequently indexed to the station 45 by indexing table 39. With the mandrel 42 at station 47 now retracted from within core 26 of the completed strip conductor coil 25, the cylinder 57 can be deactuated to return the stripping members 54 to the open position illustrated in FIGURE 2 whereby such members drop the completed strip conductor coil 25 onto a chute means 58. The completed strip conductor coil 25 moves down chute 58 to a table 60 for subsequent testing, packaging and the like of the completed strip conductor coils 25 produced by apparatus 32.

As illustrated particularly in FIGURE 4, the elongated strip 27 is adapted to be fed from its supply roll 34 around a turn roll 61 and through a suitable slack reducing and tension applying device designated generally by the numeral 62. Device 62 has a freely rotatable roller 63 carried by a lever 64 which is pivotally mounted to the frame 33 of apparatus 32 by a pivot means 65.

The elongated strip 27 continues from roller 63 around a pair of rolls 70 and 71 and through a device designated generally by the numeral 72 which attaches leads 30 and 31 to the elongated strip 27 in a known manner. The strip 27 continues beyond the lead attaching device 72 between a combination guide means and bearing surface means designated by the numeral 73 and a table 74 to winding station 46. The strip 27 moves from supply roll 34 to winding station 46 so that side edge means thereof is kept in a substantially vertical plane for reasons which will be explained in detail hereinafter.

Apparatus 32 also has a pair of taping head means designated by the numerals 75 and 76 which are employed to start strip 27 on core 26 as well as tape the final coil or layer of coil construction 25 in position to prevent unwinding thereof. The manner in which lead attaching device 72, guide 73, table 74, and taping heads 75 and 76 are utilized in forming coil construction 25 will be more thoroughly understood by referring to the detailed description of similar components fully disclosed in the copending patent application Ser. No. 497,069 referenced above. However, a detailed understanding of the operation of components 72–76 is not necessary to thoroughly understand the operation of the apparatus or device 28 of the present invention.

The slack reducing and tension applying device 62 has a tension spring 80 which has one end attached to lever 64 as shown at 81 and its opposite end is attached to the frame 33 at 82. Spring 80 operates to continuously yieldingly urge lever 64 in a clockwise direction about its pin 65 and thereby cause the roller 63 carried at its terminal swinging end to apply tension on the elongated strip 27 as it moves to winding station 46.

Device 62 also has a pair of adjustable stops arranged on opposite sides of lever 64. Each adjustable stop comprises block means or a block 83 which is suitably fastened to frame structure 33 and a threaded stop bolt 84 which is threaded through a cooperating threaded opening in block 83 so as to be readily adjustable toward and away from pivoted lever 64. With this arrangement it is readily possible to thread each stop bolt 84 any desired amount toward and away from pivoted lever 64 and thereby control the arc through which pivoted lever 64 is allowed to swing under the influence of spring 80 and the force exerted by strip 27 as it moves over roller 63 at the terminal end of lever 64.

The configuration of coil construction 25 can be more accurately and economically controlled for many applications of such coil construction by controlling the manner in which the elongated strip 27 is moved to winding station 46 and wrapped around an associated core 26 to define the coil construction. In particular, it has been found that it is preferable to control the unwinding of elongated strip 27 from supply roll 34 using the control device 29, see FIGURES 6–9.

Support shaft means such as a shaft 86 supports the supply roll 34 for free rotation about a fixed axis of rotation. In addition, the outside diameter of shaft 86 is slightly smaller than the inside diameter of the core means carrying supply roll 34 to thereby allow free axial movement of the supply roll 34 along shaft 86 and hence along the fixed axis of rotation defined by shaft 86. Thus, supply roll 34 is freely rotatable about shaft 86 and such supply roll is also freely axially movable along shaft 86 thereby enabling control means comprising device 29 and designated generally by the numeral 87 to be used to continuously axially position supply roll 34 so that the outer coil of such supply roll 34 is always maintained in the same substantially fixed vertical plane.

The control means 87 comprises guide means shown as a pair of freely rotatable rollers each designated by the numeral 90 and bearing surface means shown as another freely rotatable roller designated generally by the numeral 91. The guide rollers 90 and bearing roller 91 are carried on suitable carriage means designated generally by the numeral 92 and which comprises the control means 87.

Carriage means or carriage assembly 92 is supported for movement substantially radially toward and away from supply roll 34 on suitable track means comprised of a vertically arranged plate means or plate assembly designated by the numeral 94 which supports the carriage assembly 92 for vertical movement in a fixed substantially vertical plane and along a substantially rectilinear path.

The device 29 also comprises urging means shown as a tension spring 95 which acts together with the force of gravity to pull carriage assembly 92 toward supply roll 34. The tension spring 95 has its upper end fastened to a suitable hook 96 which is fixed to carriage assembly 92 and has its lower end fastened to a pin 97 which is threaded into a cooperating threaded opening in plate assembly 94 as shown at 100; and, spring 95 is stretched therebetween to continuously pull the carriage assembly 92 toward the supply roll 34.

As seen particularly in FIGURES 7 and 8, carriage assembly 92 has an outwardly extending arm designated by the numeral 101 which supports rollers 90 and 91. Arm 101 has a threaded blind hole 102 adjacent its inner end which is adapted to receive the threaded end portion 103 of a shaft 104 which supports the inner guide roller 90 at its terminal end. The outer roller 90 is supported on a shaft 105 which has a threaded terminal end portion 106 which extends through an opening 107 in arm 101 and is suitably fastened in position by a pair of nuts each designated by the numeral 110 and which are threaded on threaded portion 106 so as to fasten shaft 105 in position on outwardly extending arm 101.

Arm 101 also has a pair of parallel legs each designated by the numeral 111 extending downwardly therefrom in parallel spaced apart relation and adapted to carry roller 91 therebetween. Roller 91 is carried on a shaft 112 which is supported between the downwardly extending legs 111 so that roller 91 is freely rotatable.

Thus, it is seen that outwardly extending arm 101 and the rollers 90 and 91 supported thereon are supported essentially in a cantilevered manner from the carriage assembly 92.

The carriage assembly 92 and hence rollers 90 and 91 are adapted to move in a substantially fixed vertical plane and in a rectilinear path so that as the outer layer of elongated strip 27 leaves its supply roll 34 it is always held in a substantially fixed plane. This action is achieved because of the manner in which the carriage assembly 92 is supported for precise vertical movement.

The carriage assembly 92 is maintained at a predetermined desired position with respect to the outer periphery of supply roll 34 by the bearing surface means or roller 91 engaging its outer circumference. As the spring 95 and the force of gravity act against the carriage assembly 92, the roller 91 is urged and held against the outer circumference of supply roll 34 to thereby position the guide rollers 90 on opposite sides of the freely rotatable and freely axially slidable supply roll 34 and thus continuously axially position such supply roll causing each side edge means of the elongated strip 27 to remain in a substantially fixed vertical plane for easier winding of strip 27 on an associated core 26.

The plate assembly 94 has a pair of parallel spaced apart vertically arranged wheel receiving groove means each designated by the same numeral 114. Plate assembly 94 may comprise a portion of the supporting structure 33 of apparatus 32 or may comprise a separate unit which is suitably fastened in position to supporting structure 33.

Plate assembly 94 also has an elongated opening 115 preferably arranged between groove means or grooves 114 and arranged parallel to grooves 114. Elongated opening 115 is adapted to receive fastening means therethrough which is used to fasten a first carriage 116 and a second carriage 118 comprising the carriage assembly 92.

The first carriage 116 has a plurality of four rotatable wheel means or wheels each designated by the numeral 117. Carriage 116 is adapted to move along the front surface of plate assembly 94 so that its wheels 117 are guided by grooves 114 to thereby guide carriage 116 in a substantially rectilinear vertical path.

The second carriage 118 also has a plurality of four rotatable wheel means or wheels each designated by the numeral 121. Carriage 118 is arranged against the rear surface means of the plate assembly 94.

The fastening means provided for fastening carriages 116 and 118 together to define the carriage assembly 92 comprises a fastening plate 123 which has a width allowing it to be freely inserted through elongated opening 115. Plate 123 has carriage 116 fixed thereto by a threaded bolt 124 which extends through an opening 125 in carriage 116 and is threaded into a cooperating threaded opening 126 in the forward face of plate 123. Similarly, carriage 118 is fixed to the rear portion or face of plate 123 by a pair of bolts each designated by the numeral 130 and each extending through an associated opening 131 extending through carriage 118 and each bolt 130 is threaded into a cooperating threaded opening 132 provided in plate 123.

The above described structural arrangement fastens carriages 116 and 118 on opposite sides of plate assembly 94 and the arrangement of fastening member 123 is such that the entire carriage assembly 92 can be moved vertically up and down along plate assembly 94 in an unobstructed manner.

As seen in the drawings, the carriages 116 and 118 have their respective wheels engaging opposite side surface means of vertical plate means or assembly 94. As previously mentioned, the wheels 117 of carriage 116 are adapted to be received within grooves 114 in the front surface of plate assembly 94 so as to guide carriage 116 as well as the entire carriage assembly 92 vertically up and down along the vertical plate assembly 94. It will be appreciated that the above described structural arrangement provides a precise movement for the guide means comprised of guide rollers 90 and the bearing surface means comprised of bearing surface roller 91.

Each carriage 116 and 118 comprising carriage assembly 92 preferably has four wheels as previously mentioned. The wheels 117 of carriage 116 are suitably rotatably supported about a pair of axles each designated by the numeral 135. Similarly, wheels 121 of carriage assembly 118 are also rotatably supported about a pair of axles each designated by the numeral 136. Each set of axles 135 of carriage 116 and axles 136 of carriage 118 are arranged in spaced apart relation so that with their associated wheels installed in position a broad stable base is provided for each individual carriage 116 and hence for the entire carriage assembly 92. This structural arrangement assures that the movement of rollers 90 and 91 is less affected by minor imperfections in plate assembly 94 as such carriage assembly moves vertically up and down along such plate assembly.

Means is provided for latching the carriage assembly 92 in its uppermost position, see FIGURE 9, and such means comprises a pin 140 fixed to the upper end portion 116 of carriage assembly 92 and a suitable latch 141 supported at the upper end portion of plate assembly 94. The latch 141 is pivotally mounted about a pivot screw 142 and has a coiled spring 143 which acts between a pin 144 provided on the plate assembly 94 and latch 141 so as to continuously urge latch 141 so that its hooking end portion 145 extends substantially across the upper end of elongated opening 115 in the plate assembly 94.

The carriage assembly 92 is adapted to be raised to the top of plate assembly 94 and the hooking end portion 145 of latch 141 is latched beneath pin 140 to hold the carriage assembly 92 in its uppermost position allowing easy installation of a new supply roll 34, for example. When it is desired to lower the carriage assembly 92 it is merely necessary to rotate latch 141 in a clockwise manner releasing its hooking end portion 145 from beneath pin 140 and allowing the carriage assembly 92 to return to its lowermost position with bearing surface roller 91 engaged against the top circumferential surface of the new supply roll 34 and the guide rollers 90 engaging along opposite side edge portions of the new supply roll 34.

The device 29 continuously repositions freely rotatable supply roll 34 axially along its supporting shaft 86 so that as each outer layer leaves the supply roll 34 it is maintained in a substantially fixed vertical plane. This controlled unwinding of supply rool 34 enables easier forming of coil construction 25.

In addition to the above described action of rollers 90 of device 29 the roller 91 of such device prevents the spring 95 and the force of gravity from moving the guide rollers 90 too far radially inwardly toward the center of supply roll 34 during the winding of coil construction 25. Also, roller 91 cooperates with the improved device 28 of this invention to help prevent the supply roll 34 from overrunning.

As previously mentioned, the improved control device also referred to as a brake device 28 of this invention, see FIGURES 10–16, is designated generally by the numeral 28 and device 28 is adapted to be used with the device 29 to assure smooth operation of coil winding apparatus 32 during the forming of coil construction 25.

As seen particularly in FIGURE 14 of the drawings, the improved control device 28 comprises freely rotatable roller means shown as a roller assembly 150 which is supported on shaft means shown as a central fixed shaft 151 which is fastened in any suitable manner at the terminal end of an associated arm means 154. The arm means or arm 154 in this example of the invention is pivotally supported on pivot means shown as a pivot pin 155 which is suitably fixed to a portion of the frame structure 33 of the coil winding apparatus 32. The pivot pin 155 supports one end portion of arm 154 so that such arm is supported for free pivoting movement about pivot pin 155.

The roller means or assembly 150 is yieldingly urged against the outer circumference of the supply roll 34 so that such supply roll rotates roller assembly 150 simultaneously therewith. Stopping or brake means is provided for controlling and stopping rotation of the roller assembly 150, as will be described in detail subsequently, and such brake means provides controlled unwinding of elongated strip material 27 under substantially uniform tension and prevents the supply roll 34 from overrunning during unwinding thereof and stopping in the event the coil winding operation is stopped for any reason.

Arm 154 has a swinging end portion designated by the numeral 156 which carries the previously mentioned shaft 151. Shaft 151 supports shaft means shown as a freely rotatable tubular shaft 157, see FIGURE 16, concentrically therearound for free rotation. Shaft 151 has a pair of spaced apart ball bearings suitably fastened thereto adjacent its opposite ends and each ball bearing designated by the numeral 158. The inner race of each ball bearing 158 is suitably fixed to shaft 151 while its outer race is fixed within an associated bore provided in an associated end of tubular shaft 157. Thus, it is seen, that tubular shaft 157 is carried by arm 154 adjacent its swinging end and is freely rotatable.

Shaft 157 has outer threads designated by the numeral 157A provided on its outer surface and roller means 150 comprises a tubular load carrying member 147 which has internal threads 147A enabling member 147 to be threaded on threads 157A of shaft 157 to fix roller means 150 to shaft 157 so that they rotate together simultaneously as a unit.

Roller assembly 150 preferably has its circumferential surface means made of a resilient rubber-like material shown as a rubber-like ring 148. Ring 148 is clamped against an annular shoulder 147B comprising member 147 by a suitable threaded fastening nut 149 which is threaded along threads 157A and urges an adjoining clamping washer 149B against ring 148 to compress such ring against shoulder 147B and fix it firmly in position.

Figure 15:
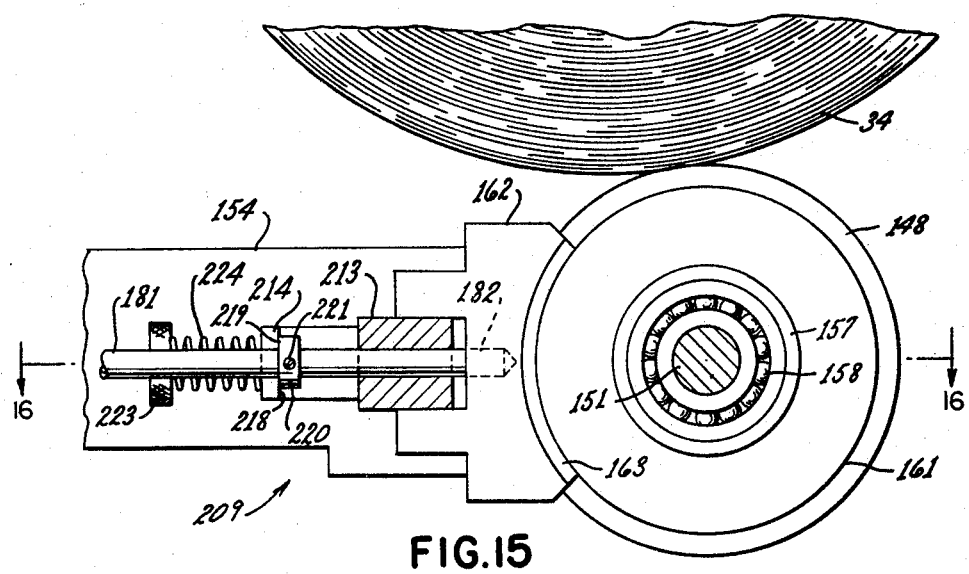
FIGURE 15 is a view with parts in section and parts broken away particularly illustrating adjusting means used to adjust the position of a brake shoe comprising such brake means against its associated brake drum.
Figure 16:
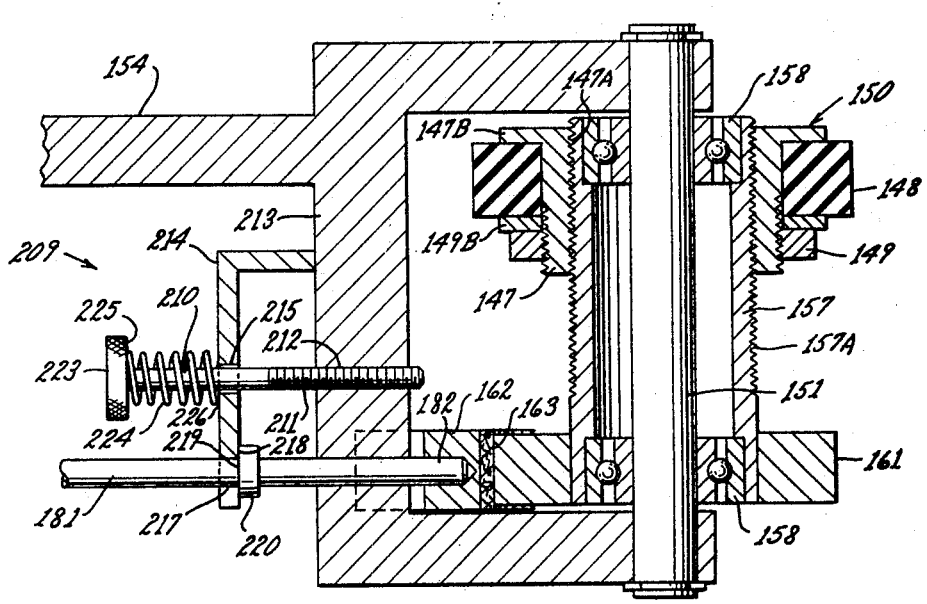
FIGURE 16 is a sectional view on the line 16—16 of FIGURE 15.

Thus, it will be apparent from FIGURES 14 and 15 of the drawings that as roller assembly or roller 150 engages the outer periphery of supply roll 34 (more specifically ring 148 of roller 150 engages supply roll 34) roller 150 and shaft 157 are simultaneously rotated by supply roll 34.

The previously mentioned brake means provided for controlling and stopping rotation of roller means or roller 150 and hence supply roll 34 comprises means for stopping the free rotation of shaft 157 and includes a brake drum 161 suitably fixed to the opposite end of tubular shaft 157 for simultaneous rotation therewith. Thus, as the outer periphery of the supply roll 34 engages roller 150 it will be seen that roller 150, shaft 157, and brake drum 161 are all simultaneously rotated. The brake or stopping means also comprises brake shoe means shown as a brake shoe 162 which is slidably supported on arm 154 for movement toward and away from brake drum 161.

The brake shoe 162 has a cylindrical frictional surface means 163 which is made of a suitable frictional material which is adapted to engage the outer circumference of brake drum 161. The brake shoe 162 and frictional surface means 163 is normally held in yielding and precisely controlled manner against brake drum 161 to impose a rotation restraining force against drum 161 and hence roller assembly 150 and supply roll 34 causing elongated strip to be held under constant tension as it is unwound from supply roll 34. Adjusting means is provided for adjusting and holding the brake shoe 162 in position and such adjusting means will be described in detail subsequently. The brake shoe 162 is also adapted to instantaneously stop brake drum 161 and hence supply roll 34 to prevent it from overrunning upon being actuated by associated actuating means.

Urging means is provided as a part of device 28 for yieldingly urging roller 150 against supply roll 34 and comprises means for yieldingly pivoting arm 154 about its pivot pin 155 in a counterclockwise manner (as viewed in FIGURE 11) to thereby urge roller 150 into peripheral engagement with supply roll 34. As seen particularly in FIGURES 10 and 11 of the drawings, the urging means comprises an elongated member shown as an elongated rod 165 which has hook means shown as a hook 166 at its lower end and hook 166 also has a handle portion or knob 167 at its terminal end to enable easy grasping thereof.

The rod 165 is supported vertically adjacent a vertically extending portion of support structure 33 by a pair of blocks each designated by the numeral 171. Each block 171 has an opening extending substantially vertically therethrough and is adapted to receive rod 165 for sliding movement therealong.

Compression spring means shown as a compression spring 172 also comprises the above mentioned urging means for urging roller 150 against supply roll 34. Rod 165 has a collar 175 fixed thereto in any suitable manner at a predetermined position therealong. The compression spring 172 is adapted to act between the lower supporting block 171 and collar 175 to thereby urge collar 175 and rod 165 vertically upwardly. As spring 172 urges rod 165 upwardly and with hook portion 166 hooked around arm 154 as shown at 173 in the drawings, it will be seen that the tendency of spring 172 is to urge arm 154 in a counterclockwise manner about pivot pin 155 to thereby move roller 150 into frictional engagement against the outer periphery of supply roll 34.

As previously mentioned, the brake shoe 162 is suitably supported on arm 154 for sliding movement toward and away from brake drum 161. Plunger means shown as a plunger assembly designated generally by the numeral 180 is also provided and carried by arm 154 for moving brake shoe 162 toward and away from brake drum 161. The plunger assembly 180 comprises a rod 181 which has one end 182 operatively connected to brake shoe 162 by any suitable means such as threading, staking, welding, or the like, and rod 181 has its opposite end adapted to be engaged by actuating means which is actuated in response to a reduction in tension in elongated strip 27 as it moves from supply roll 34 through control device 29 to winding station 46. Specifically, rod 181 has a freely rotatable cam roller 183 suitably supported in position at its end opposite from brake shoe 162.

The rod portion 181 of plunger assembly 180 is supported for sliding movement along arm 154 by a pair of supporting members designated by the numerals 185 and 186. Members 185 and 186 are fastened to arm 154 in spaced apart relation and in any suitable manner. Member or support 185 has a cylindrical bore 187 extending therethrough and is adapted to receive and support the rod 181 for sliding movement therealong.

Support 186 has a threaded bore shown at 190 extending therethrough which is adapted to threadedly receive a threaded member designated by the numeral 191. Member 191 has a central bore 192 extending therethrough which has an inside diameter slightly larger than the outside diameter of rod 181 to thereby support rod 181 for sliding movement therethrough.

Holding means shown as a tension spring 193 is provided for yieldingly holding rod 181 and the brake shoe 162 connected thereto away from brake drum 161. The tension spring 193 is suitably fastened between the terminal end of threaded member 191 and a suitable collar 194 fixed to rod 181. The tension spring 193 pulls the rod 181, and thus brake shoe 162, to the left as viewed in FIGURE 11 of the drawings causing rod 181 to slide easily through opening 192 of adjusting member 191 and opening 187 of the supporting member 185. The threaded member 191 is easily threaded along member 186 and controls the amount that tension spring 193 is stretched which tends to urge the brake shoe 162 away from drum 161. Spring 193 cooperates with an adjusting means to be subsequently described to assure brake shoe 162 is held against drum 161 in a precisely controlled manner. Device 28 also has actuating means for forcefully actuating the above described brake means to prevent the supply roll from overrunning upon stopping the winding operation and such actuating means is operated by reduced tension in the elongated strip 27 as previously mentioned. The actuating means comprises another rod means shown as a rod 195 which is supported by a support 196 at its upper end and a support 197 adjacent its lower end to enable substantially vertical sliding movement of rod 195 through cooperating openings provided in supports 196 and 197.

Rod 195 has yielding means shown as a spring 198 acting between support 197 and an extension member 199 suitably fixed to rod 195. Spring 198 operates to normally continuously urge rod 195 upwardly.

Rod 195 has cam means provided thereon shown as a cam 200 provided adjacent its lower end and having a cam surface 201 which is adapted to engage cam roller 183. Cam surface 201 in this example has a substantially frustoconical configuration.

Rod 195 also has upper surface means shown as an upper surface 202 which is engaged by lever 64 comprising the slack reducing device 62. During normal moving of elongated strip 27 from supply roll 34 to winding station 46 to enable forming of coil construction 25, the elongated strip 27 passes over roll 63 and thereby pivots lever 64 about its pivot 65 pushing rod 195 downwardly so that its cam surface 201 does not engage the cam roller 183 and is essentially in the position illustrated in FIGURE 11 of the drawings. However, upon reducing tension in the elongated strip 27 as by an abrupt slowdown or stopping of the winding operation, for example, the reduced tension would normally tend to cause supply roll 34 to overrun. However, as seen in FIGURE 10, with such reduced tension the lever 64 of slack reducing device 62 moves clockwise about its pivot 65 causing rod 195 to be pushed upwardly by yielding means or spring 198.

With rod 195 pushed upwardly by spring 198 it will be seen that frustoconical cam surface 201 engages cam roller 183 and pushes the rod 181 of the plunger means 180 to the right as viewed in FIGURE 10 thereby causing brake shoe 162 to forcefully engage and stop brake drum 161, shaft 157, roller 150, and hence supply roll 34.

Rod 195 has means shown as threaded extension and retraction means or device 199, see FIGURE 13, for extending or reducing the effective length of rod 195. It will be appreciated that this provision of retraction device 199 for extending and reducing the length of rod 195 enables more effective utilization and proper control of cam surface 201 in accordance with the action of lever 64 comprising slack reducing and tension applying device 62.

The improved brake device of this invention also has disabling means shown as a disabling handle 205 for disabling compression spring 172. The disabling handle 205 has its inner end supported for pivoting movement about a pivot 206 and its outer end provided with means shown as a hook 207.

Thus, it is seen that with the use of disabling member 205 it is readily possible to disable the action of compression spring 172 by grasping knob 167 and pulling rod 165 downwardly thereby compressing spring 172 and lowering the terminal upper end of rod 165 so that it is beneath the hooking end portion 207 of disabling arm 205. With this arrangement it is seen that the hooking portion 207 can be fastened in position above the terminal upper end of rod 165, see FIGURE 13, and thereby allow the arm 154 to pivot clockwise downwardly about its pivot 155 enabling easy installation and maintenance of supply roll 34.

As previously mentioned brake shoe 162 is urged and held in frictional contact with brake drum 161 in a precise adjustably controlled manner to provide controlled unwinding of strip 27, under substantially uniform tension, from supply roll 34. In this example of the invention adjusting means designated generally by the numeral 209 is provided for precisely yieldingly adjustably controlling the brake means to provide a rotation restraining force partially restraining free rotation of brake drum 161 and hence roller assembly 150 and thereby provide such controlled unwinding under uniform tension.

The adjusting means or assembly 209 in this example of the invention comprises an adjusting screw or bolt 210 having a threaded end portion 211 which is threaded in a cooperating threaded opening 212 provided in an outward extension 213 of arm means 154. The assembly 209 also comprises a substantially L-shaped member 214 which has a cylindrical large diameter opening 215 which is adapted to receive an unthreaded portion of adjusting bolt 210 therethrough for free sliding movement. The L-shaped member 214 has a cutout 217 provided adjacent its terminal outer end defined by a substantially U-shaped cut provided in member 214. Member 214 is adapted to be fastened in position on arm 154 by extending bolt 210 through opening 215 and then threading end portion 211 within threaded opening 212 in extension 213 of arm 154.

The rod 181 slidably supported on arm 154 has a collar 220 fixed thereto adjacent brake shoe 162 by any suitable means such as a set screw 221. The opening 217 provided in member 214 is such that it surrounds rod 181 and surface portion 218 of member 214 adjoining opening 217 is adapted to engage an associated outer surface portion 219 of collar 220.

The adjusting bolt 210 also has a knurled knob 223 comprising its terminal outer end and has yielding means shown as a precisely wound compression spring 224 which is compressed between inside surface means 225 of knurled knob 223 and an outside surface portion 226 of member 214. Thus, upon threading adjusting bolt 210 within its associated threaded opening 212 the compression spring 224 is yieldingly compressed between surfaces 225 and 226.

As the adjusting bolt 210 is threaded within threaded opening 212 it moves surface portion 218 of member 214 against surface portion 219 thereby moving the collar 220 and hence rod 181 with brake shoe 162 fixed thereto into frictional engagement with brake drum 161. The spring 224 provides a yielding adjustment for precisely controlling the force with which brake shoe 162 engages the brake drum 161. The brake shoe 162 is thus lightly held against drum 161 during the winding of coil 25 and serves as a rotation restraining force against drum 161, shaft 157, and hence roller 150 thereby restraining rotation of supply roll 34 to assure that strip 27 must be pulled with a substantially constant force to enable it to be unwound from its supply roll 34. The adjusting means 209 operates to in effect override the action of tension spring 193 to provide a finely balanced control for the brake shoe 162.

Figure 17:
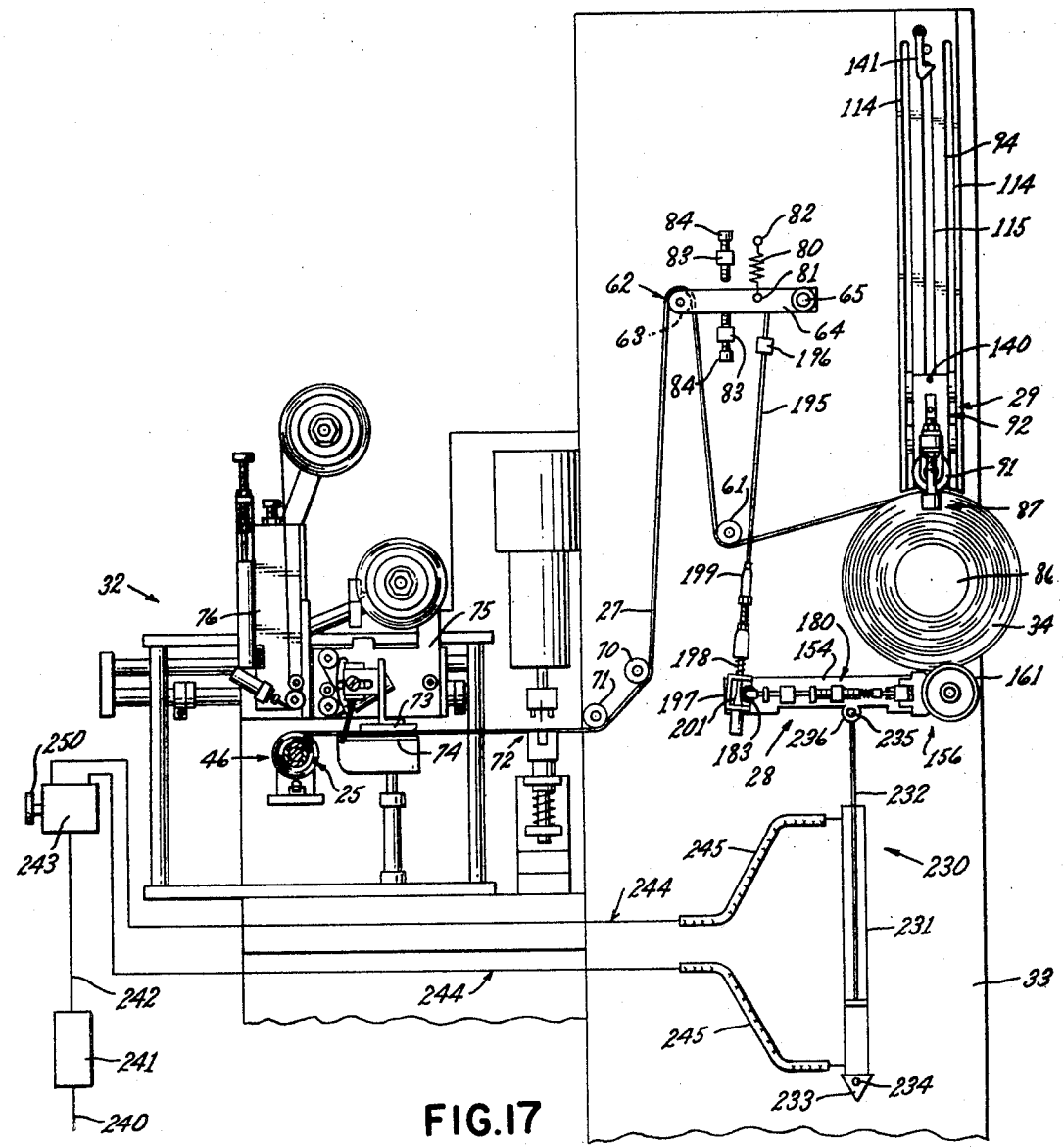
FIGURE 17 is a view similar to FIGURE 4 and illustrating another embodiment of urging means which may comprise the control device of this invention.

Another exemplary embodiment of urging means which may be used as a part of device 28 is illustrated in FIGURE 17 of the drawings. The urging means of FIGURE 17 comprises a fluid operated actuator designated generally by the numeral 230 and which includes a pneumatic cylinder 231 which has a telescoping rod 232 extending outwardly from one end thereof. The pneumatic cylinder 231 has a flange 233 extending from its lower end and a pivot pin 234 is inserted through an opening provided in flange 233 and fastened to frame structure 33 to support the lower end of actuator 230 for pivoting movement. The upper end portion of telescoping rod 232 has a hinge pin 235 extending therethrough which attaches the rod 232 to a boss 236 provided on the lower part of arm 154.

The fluid medium utilized in this example of the invention to actuate the pneumatic cylinder 231 is air under pressure which is provided from a suitable source through a supply line 240. A pressure control valve 241 is installed in the downstream end of the supply line 240 and control valve 241 may have provisions for adjusting the air pressure which is to be supplied to the fluid cylinder 230 in a precise manner.

The control valve 241 has a line 242 connected to its downstream end which is connected to a switcher valve 243 and valve 243 is utilized to switch the flow of air to one end or the other of a piston slidably carried within cylinder 231 and fixed to the lower end of rod 232. The valve 243 has a pair of fluid conduits each designated generally by the same numeral 244 which extend from valve 243 to opposite ends of the cylinder 231. Each conduit 244 has a flexible tube portion 245 comprising its downstream end portion and the flexible portions 245 allow the fluid cylinder to pivot about pivot pin 234 in a free manner.

The valve 243 of this example of the invention also has a control knob 250 which is utilized to manually switch the air under pressure to one end of cylinder 231 or the other. During a normal coil winding operation control knob 250 is turned so that air is ported through valve 243 to the lower end of cylinder 231, as viewed in FIGURE 17, and thereby the telescoping rod 232 is urged upwardly to urge arm 154 and hence roller 150 against the supply roll 34 with a substantially constant force.

The use of fluid operated actuator 230 assures that the force exerted by the roller 150 against the supply roll 34 remains substantially constant irrespective of whether the supply roll is comparatively new, i.e. full diameter, or has been considerably diminished in diameter by unwinding a substantial portion thereof. This feature further assures that the unwinding of supply roll 34 and thus the winding of each coil construction is achieved under substantially uniform tension.

The embodiment of urging means illustrated in FIGURE 17 is very simple to operate. For example, it is merely necessary to move the control knob 250 in one direction to port air to the top of the cylinder 231 and thereby retract the rod 232 allowing arm 154 to swing in a clockwise manner about its pivot pin to thereby provide easy access to the supply roll 34 for maintenance or replacement thereof. Moving the control knob 250 in the opposite direction ports air to the bottom of cylinder 231 and thereby yieldingly urges roller 150 against supply roll 34.

A manually operated control knob 250 is illustrated in this example as being used in association with the valve 243. However, it will be appreciated that an automatic system may be utilized in lieu of the manual control knob 250 or in conjunction with such control knob 250 to assure that once apparatus 32 is turned on air is always supplied to the lower end of the cylinder 231 to assure that arm 154 is pivoted upwardly and the roller 150 is urged against the supply roll 34 in the manner described above.

Thus, it is seen that the improved device 28 of this invention cooperates with the device 29 to assure that elongated strip 27 moves from its substantially free wheeling supply roll 34 in a smooth manner and under substantially uniform tension to winding station 46 to provide improved coil construction 25. The device 28 also prevents supply roll 34 from overrunning, as previously described, upon stopping of the winding operation to attached electrical leads, or the like.

In this example of the invention roller means 150 is shown as a single right circular cylindrical roll which is suitably held against the outer periphery of supply roll 34. However, other roller means such as a plurality of rollers, a belt system, or the like, may be effectively utilized in accordance with the teaching of this invention in those applications where greater frictional contact is desired between the roller means and supply roll.

While present preferred embodiments of this invention, and methods of practicing the same, have been illustrated and described, it will be recognized that this invention may be otherwise variously embodied and practiced within the scope of the following claims.

What is claimed is:

1. In combination: a strip conductor coil winding apparatus and a control device for a freely rotatable supply roll of elongated strip material provided on said coil winding apparatus and used to define a coil construction, said control device comprising, freely rotatable roller means, urging means yieldingly urging said roller means against said supply roll to enable said supply roll to rotate said roller means simultaneously therewith, and brake means for controlling rotation of said roller means to provide controlled unwinding of said strip material under substantially uniform tension, said brake means also operating to stop said roller means upon stopping said apparatus to thereby provide a braking force against the outer periphery of said supply roll to prevent said supply roll from overrunning.

2. The combination as set forth in claim 1 in which said coil winding apparatus comprises tension applying means applying tension against said elongated strip material and said device further comprises actuating means for substantially instantaneously forcefully actuating said brake means, said actuating means having cam means provided as an integral part thereof and said cam means being operated by said tension applying means to provide said instantaneous and forceful actuation by said actuating means in response to reduced tension in said strip material as it is being unwound from said supply roll.

3. The combination as set forth in claim 2 in which said device further comprises, arm means, pivot means supporting one end portion of said arm means for pivoting movement, and freely rotatable shaft means carried by said arm means adjacent its swinging end, said shaft means having said roller means fixed thereto to enable free rotation of said roller means and shaft means by said supply roll and said urging means applying an urging force which pivots said arm means about its pivot means to yieldingly urge said roller means against said supply roll.

4. In combination: a strip conductor coil winding apparatus and a control device for a supply roll of elongated strip material provided on said coil winding apparatus and used to define a coil construction, said coil winding apparatus comprising tension applying means applying tension against said elongated strip material, said control device comprising, freely rotatable roller means, urging means yieldingly urging said roller means against said supply roll to enable said supply roll to rotate said roller means simultaneously therewith, brake means for controlling and stopping rotation of said roller means to provide controlled unwinding of said strip material under substantially uniform tension and prevent said supply roll from overrunning upon stopping said apparatus, actuating means for substantially instantaneously forcefully actuating said brake means, said actuating means being operated by said tension applying means in response to reduced tension in said strip material as it is being unwound from said supply roll, arm means, pivot means supporting one end portion of said arm means for pivoting movement, freely rotatable shaft means carried by said arm means adjacent its swinging end, said shaft means having said roller means fixed thereto to enable free rotation of said roller means and shaft means by said supply roll and said urging means applying an urging force which pivots said arm means about its pivot means to yieldingly urge said roller means against said supply roll, said actuating means comprising rod means supported for axial movement toward and away from said pivot means, said rod means having cam means provided thereon adjacent its lower end which is adapted to engage and actuate said brake means adjacent said pivot means and having upper surface means engaged by said tension applying means, and further comprising yielding means continuously yieldingly urging said rod means and its cam means to engage and actuate said brake means so that with reduced tension in said strip material said tension applying means allows said upper surface means to move further away from said pivot means allowing said yielding means to move said cam means to instantantaneously actuate said brake means.

5. The combination as set forth in claim 4 in which said urging means comprises compression spring means.

6. In combination: a strip conductor coil winding apparatus and a control device for a supply roll of elongated strip material provided on said coil winding apparatus and used to define a coil construction, said coil winding apparatus comprising tension applying means applying tension against said elongated strip material, said control device comprising, freely rotatable roller means, urging means yieldingly urging said roller means against said supply roll to enable said supply roll to rotate said roller means simultaneously therewith, brake means for controlling and stopping rotation of said roller means to provide controlled unwinding of said strip material under substantially uniform tension and prevent said supply roll from overrunning upon stopping said apparatus, actuating means for substantially instantaneously forcefully actuating said brake means, said actuating means being operated by said tension applying means in response to reduced tension in said strip material as it is being unwound from said supply roll, arm means, pivot means supporting one end portion of said arm means for pivoting movement, freely rotatable shaft means carried by said arm means adjacent its swinging end, said shaft means having said roller means fixed thereto to enable free rotation of said roller means and shaft means by said supply roll and said urging means applying an urging force which pivots said arm means about its pivot means to yieldingly urge said roller means against said supply roll, said brake means comprising a brake drum fixed to said shaft means for simultaneous rotation therewith, brake shoe means slidably supported on said arm means for movement toward and away from said brake drum, and plunger means slidably carried by said arm and having one end operatively connected to said brake shoe means and its opposite end adapted to be actuated by said actuating means, and said device further comprises adjusting means operatively connected to said plunger means, said adjusting means precisely yieldingly adjusting said plunger means and hence said brake shoe means into contact with said brake drum to provide a rotation restraining force to partially restrain said free rotation of said roller means while providing said contolled unwinding, with said brake shoe means also being adapted to be forcefully actuated by said actuating means engaging said opposite end of said plunger means and move said plunger means and brake shoe means into frictional engagement with said brake drum to stop said roller means and supply roll.

7. A method of controlling a supply roll of elongated material means during unwinding thereof comprising the steps of, supporting said supply roll of material means for free rotation, unwinding said material means from said supply roll, urging a freely rotatable roller means in a yielding manner against said supply roll with associated urging means to enable said supply roll to rotate said roller means simultaneously therewith during said unwinding step, controlling rotation of said roller means with brake means acting against the outer periphery of said roller means to provide controlled unwinding of said material means from said supply roll under substantially uniform tension during said unwinding step, and stopping said roller menas with said brake means upon stopping said unwinding to thereby provide a braking force against the outer periphery of said supply roll to stop said supply roll and prevent it from overrunning.

8. A method as set forth in claim 7 comprising the further step of adjustably controlling said brake means with an associated adjusting means to provide a rotation restraining force which acts against said outer periphery of said roller means and partially restrains said free rotation of said roller means and provides said controlled unwinding under uniform tension during said controlling step.

9. A method as set forth in claim 7 comprising the further step of operating mechanical cam means comprising actuating means for said brake means in response to reduced tension in said material means as it is being unwound from said supply roll during said unwinding step, said cam means operating said actuating means to substantially instantaneously and forcefully actuate said brake means against said outer periphery of said roller means and stop said roller means and thus said supply roll during said stopping step.

10. A method as set forth in claim 9 in which said urging step comprises urging said roller means against said supply roll with a fluid operated actuator and comprising the further step of controlling said actuator to hold said roller means against said supply roll with a substantially constant force.

11. A control device for a freely rotatable supply roll of elongated material means to enable controlled easy unwinding thereof comprising, freely rotatable roller means, urging means yieldingly urging said roller means against said supply roll to enable said supply roll to rotate said roller means simultaneously therewith, brake means for controlling rotation of said roller means to provide controlled unwinding of said strip material under substantially uniform tension, said brake means also operating to stop said roller means upon stopping said apparatus to thereby provide a braking force against the outer periphery of said supply roll to prevent said supply roll from overrunning during unwinding thereof, actuating means for substantially instantaneously forcefully actuating said brake means, said actuating means having mechanical cam means provided as an integral part thereof, and said cam means being operated by reduced tension in said material means as it is being unwound to provide said instantaneous and forceful actuation by said actuating means.

12. A device as set forth in claim 11 in which said urging means comprises a fluid operated actuator and an adjustable control therefor in which said actuator urges said roller means against said supply roll with an adjustable substantially constant force.

13. A device as set forth in claim 11 further comprising, arm means, pivot means suporting one end portion of said arm means for pivoting movement, and freely rotatable shaft means carried by said arm means adjacent its swinging end, said shaft means having said roller means fixed thereto to enable free rotation of said roller means and shaft means by said supply roll and said urging means applying an urging force which pivots said arm means about its pivot means to yieldingly urge said roller means against said supply roll.

14. A control device for a supply roll of elongated material means to enable controlled easy unwinding thereof comprising, freely rotatable roller means, urging means yieldingly urging said roller means against said supply roll to enable said supply roll to rotate said roller means simultaneously therewith, brake means for controlling and stopping rotation of said roller means to provide controlled unwinding of said strip material under substantially uniform tension and prevent said supply roll from overrunning during unwinding thereof, actuating means for substantially instantaneously forcefully actuating said brake means, said actuating means being operated by reduced tension in said material means as it is being unwound, arm means, pivot means supporting one end portion of said arm means for pivoting movement, and freely rotatable shaft means carried by said arm means adjacent its swinging end, said shaft means having said roller means fixed thereto to enable free rotation of said roller means and shaft means by said supply roll and said urging means applying an urging force which pivots said arm means about its pivot means to yieldingly urge said roller means against said supply roll, said actuating means comprising rod means supported for axial movement toward and away from said pivot means, said rod means having cam means provided thereon adjacent its lower end which is adapted to engage and actuate said brake means adjacent said pivot means and having upper surface means engaged by means responsive to said reduced tension, and said device further comprising spring means continuously yieldingly urging said rod means and its cam means to engage and actuate said brake means so that with reduced tension in said material means said means responsive to said reduced tension allows said upper surface means to move further away from said pivot means allowing said spring means to move said cam means to instantaneously actuate said brake means.

15. A control device for a supply roll of elongated material means to enable controlled easy unwinding thereof comprising, freely rotatable roller means, urging means yielding urging said roller means against said supply roll to enable said supply roll to rotate said roller means simultaneously therewith, brake means for controlling and stopping rotation of said roller means to provide controlled unwinding of said strip material under substantially uniform tension and prevent said supply roll from overrunning during unwinding thereof, actuating means for substantially instantaneously forcefully actuating said brake means, said actuating means being operated by reduced tension in said material means as it is being unwound, arm means, pivot means supporting one end portion of said arm means for pivoting movement, and freely rotatable shaft means carried by said arm means adjacent its swinging end, said shaft means having said roller means fixed thereto to enable free rotation of said roller means and shaft means by said supply roll and said urging means applying an urging force which pivots said arm means about its pivot means to yieldingly urge said roller means against said supply roll, said urging means comprising an elongated member having hook means at its lower end, compression spring means urging said elongated member to thereby urge said hook means against said arm means to pivot said arm means about said pivot means, and said device further comprises disabling means for disabling said compression spring means allowing said arm means and roller means to pivot away from said supply roll for easy access to said supply roll.

16. A control device for a supply roll of elongated material means to enable controlled easy unwinding thereof comprising, freely rotatable roller means, urging means yieldingly urging said roller means against said supply roll to enable said supply roll to rotate said roller means simultaneously therewith, brake means for controlling and stopping rotation of said roller means to provide controlled unwinding of said strip material under substantially uniform tension and prevent said supply roll from overrunning during unwinding thereof, actuating means for substantially instantaneously forcefully actuating said brake means, said actuating means being operated by reduced tension in said material means at it is being unwound, arm means, pivot means supporting one end portion of said arm means for pivoting movement, and freely rotatable shaft means carried by said arm means adjacent its swinging end, said shaft means having said roller means fixed thereto to enable free rotation of said roller means and shaft means by said supply roll and said urging means applying an urging force which pivots said arm means about its pivot means to yieldingly urge said roller means against said supply roll, said brake means comprising, a brake drum fixed to said shaft means for simultaneously rotation therewith, brake shoe means slidably supported on said arm means for movement toward and away from said brake drum, and plunger means slidably carried by said arm means and having one end operatively connected to said brake shoe means and its opposite end adapted to be actuated by said actuating means, and said device further comprises adjusting means operatively connected to said plunger means, said adjusting means precisely yieldingly adjusting said plunger means and hence said brake shoe means into contact with said brake drum to provide a rotation restraining force to partially restrain said free rotation of said roller means while providing said controlled unwinding, with said brake shoe means also being adapted to be forcefully actuated by said actuating means engaging said opposite end of said plunger means to move said plunger means and brake shoe means into frictional engagement with said brake drum to stop said roller means and supply roll.

17. A device as set forth in claim 16 in which said actuating means comprises rod means supported for axial movement toward and away from said pivot means, said rod means having cam means provided thereon adjacent its lower end which is adapted to engage and actuate said plunger means adjacent said pivot means and having upper surface means engaged by means responsive to said reduced tension, and said device further comprising spring means continuously yieldingly urging said rod means and its cam means to engage and actuate said plunger means so that with reduced tension in said elongated material means said means responsive to said reduced tension allows said upper surface means to move further away from said pivot means allowing said spring means to move said cam means to instantaneously forcefully actuate said plunger means and hence said brake shoe means.

References Cited
UNITED STATES PATENTS

| | | | |
|---|---|---|---|
| 1,532,753 | 4/1925 | Jones et al. | 242—75.43 |
| 2,521,413 | 9/1950 | Scheuermann et al. | |
| 2,525,600 | 10/1950 | Hornbostel | 242—75.43 |
| 2,596,428 | 5/1952 | O'Malley | 242—75.4 |

NATHAN L. MINTZ, Primary Examiner

U.S. Cl. X.R.

242—9